United States Patent
Hou

(10) Patent No.: US 6,779,099 B2
(45) Date of Patent: Aug. 17, 2004

(54) OPERATION METHOD FOR CONTROLLING ACCESS ATTRIBUTES OF A MEMORIZED PAGE OF A MEMORY UNIT AND ITS STRUCTURE

(76) Inventor: Chien-Tzu Hou, 38881 Garibaldi Common, Fremont, CA (US) 94536

(*) Notice: Subject to any disclaimer, the term of this patent is extended or adjusted under 35 U.S.C. 154(b) by 61 days.

(21) Appl. No.: 09/908,645

(22) Filed: Jul. 20, 2001

(65) Prior Publication Data

US 2003/0018869 A1 Jan. 23, 2003

(51) Int. Cl.[7] .............................................. G06F 12/00
(52) U.S. Cl. ........................ 711/170; 711/163; 711/173; 711/205
(58) Field of Search ................................ 711/163, 170, 711/173, 205

(56) References Cited

U.S. PATENT DOCUMENTS

| | | | |
|---|---|---|---|
| 4,875,156 A | * 10/1989 | Tanagawa et al. | 713/200 |
| 5,491,806 A | * 2/1996 | Horstmann et al. | 711/207 |
| 5,513,337 A | * 4/1996 | Gillespie et al. | 711/152 |
| 6,009,495 A | * 12/1999 | DeRoo et al. | 711/103 |
| 6,256,715 B1 | * 7/2001 | Hansen | 711/163 |

OTHER PUBLICATIONS

Paterson "Computer Architecture a Quantitative Approach" Morgan Kaufman Publishers, 1996, 439–457.*
Bobbin "Vitual Memory" Jul. 1996, http://cne.gmu.edu/modules/vm.*

* cited by examiner

Primary Examiner—Mano Padmanabhan
Assistant Examiner—Paul Baker
(74) Attorney, Agent, or Firm—Pro-Techtor International Services

(57) ABSTRACT

An operation method for controlling memorized page access attribute of the memory and its structure, particularly a control method for a low-level driver or system chipset to perform the control of read and write to partial areas of the memory, mainly by means of making use of buffer memory to configure procedures to perform operation area configuration of memory, and by means of practical operation procedures to confirm the operation mode of the said area, to further control said region in such modes as read only, write only, write once, read once, etc., to prevent programs which have been loaded into the memory and will be executed and passwords which have been verified from being intruded by illegal hacker, virus, etc, to provide a common protective design to the system safety.

9 Claims, 5 Drawing Sheets

OPERATION METHOD FOR CONTROLLING ACCESS ATTRIBUTES OF A MEMORIZED PAGE OF A MEMORY UNIT AND ITS STRUCTURE

BACKGROUND OF THE INVENTION

1. Field of the Invention

The present invention relates to an operation method for controlling access attributes of a memorized page of a memory and its structure, and more particularly, to an attribute configuration for controlling operation of the memorized page, making the memorized page no more comprehensively receive the storage data from CPU or hard disk, but further control and manage the data flow to provide system safety as a common protective design.

2. Description of the Prior Art

Whereas, dynamic random access memory (hereinafter referred to as DRAM) appears in the form of memorized page; that is, DRAM is composed of continuous memorized pages or continuous storage cells, for example, the size of each memorized page is 4 K Bytes, then 16 M DRAM can be divided into 4000 units of memorized pages (000~FFF) of the size of 4 K.

CPU performs the read/write control to DRAM through the chipset. The data intended to execute in a hard disk shall be written into DRAM first, then CPU shall read the data from DRAM for processing, or after the data processing performed by CPU, the processed data shall be written into DRAM, and then the hard disk will read data back from DRAM. The operation of DRAM storage is counted in memorized page. In other words, concerning the system operation of a computer in general, DRAM provides basic actions of data storage and retrieval.

As the world has gradually progressed towards computerization and digitalization, many commercial behaviors have turned to information technology application. While enjoying the efficiency, convenience and commercial opportunity brought by Internet and Intranet, computer and network safety has been gradually concerned. On the other hand, concerning computer crime, no matter in terms of technology, revision level or amount of crime, all show the tendency of skill improving and amount increasing. Therefore, most people select cryptographic system for protecting their important data. However, no matter whichever cryptographic system, the public key, the private key, or the password of the system itself or set additionally, after the cryptographic system is started, it shall be loaded in DRAM and then checked. Since DRAM is a necessary passing device of system data, and it can only receive the data conveyed from CPU or hard disk without selecting, therefore, no matter legal service of DRAM (system itself) or through intrusion of external party, all data can be easily accessed and revised. For example, a hacker may intrude into DRAM to retrieve the public key, private key and password data of the cryptographic system to change the check operation to check approval or no operation through some software (such as soft ICE), and the system can be easily accessed.

Furthermore, as the virus in a floppy disk or a optical disk is loaded into DRAM, through execution of CPU to damage or revise the important parameter in a system, these parameters may cause such influences as the configuration of memory in DRAM, the division of disk driver and the access authority of a user in using the system, etc. and make the system shut down, be damaged or unable to work normally or function in an abnormal manner. The general anti-virus programs work through comparing the virus code in a floppy disk or DVD, once the user fails to update it in time, some unknown viruses still get chances to access to DRAM and make the system shut down through execution of CPU, thus the virus written into DRAM cannot be prevented, therefore, effective prevention method still cannot be provided.

SUMMARY OF THE INVENTION

In view of this, the major object of this invention is to provide a kind of operation method for controlling access attributes of a memorized page of a memory, in particular to provide a control method for low-level driver or system chipset to perform read/write operation to partial areas of the memory, mainly by means of using register configuration procedure to perform the operable region configuration of the memory, and by means of practical operation procedure to confirm the operation mode of the said region, to further control the said region for read-only, write-only, write-once, read-once, etc., to ensure the data loaded in the memory, which include the program which will be executed and the password which will be checked, etc., to be free from the intrusion from hackers, viruses, etc., and to provide a common protection for system safety.

It is another object of the present invention is to provide a common protection for system safety to ensure the data loaded in the memory, which include the program which will be executed and the password which will be checked, etc., to be free from the intrusion from hackers, viruses, etc.

DETAILED DESCRIPTION OF THE INVENTION

Figure 1:
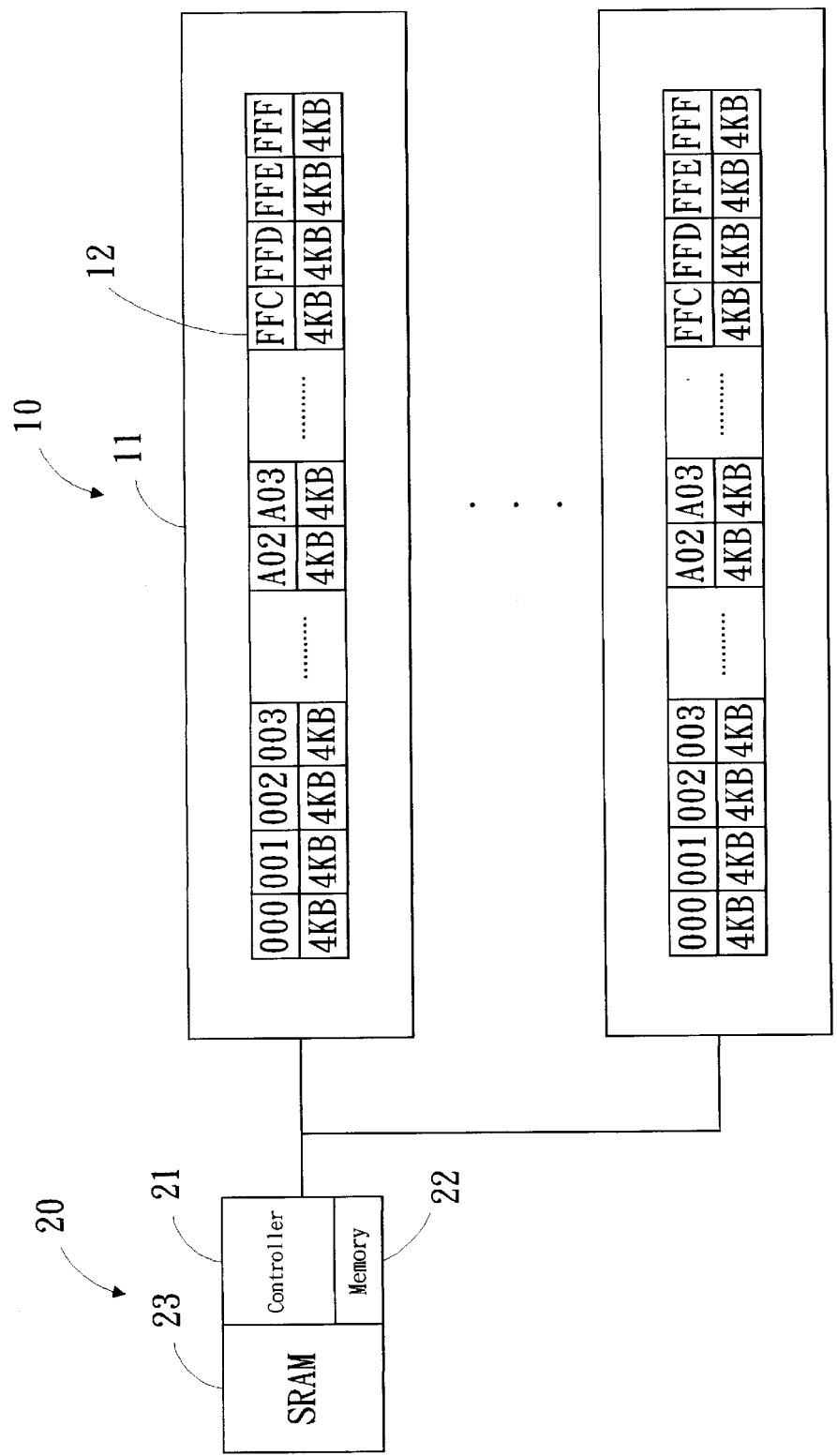
FIG. 1 is a structure diagram of DRAM in accordance with the present invention.

Referring to FIG. 1, the DRAM structure of the present invention is shown, comprising of a DRAM module 10, a memory controller 20; each DRAM module 10 includes a plurality of DRAM 11, wherein said DRAM 11 includes a plurality of memorized pages 12 (in FIG. 1, only one DRAM 111 is developed for explanation); said memory controller 20 comprises of one controller 21 which controls access to each memorized page 11, in which a memory 22 is devised (flash memory is used in the example) to store the configuration procedure result (wherein operation method is shown as follows in detail); a static random access memory 23 (hereinafter referred to as SRAM 23), which stores fast page query table, and includes a plurality of instruction bits which redirect to memorized page 12 is used to instruct whether said memorized page 12 is conducted in normal access mode or in page operation mode (wherein operation is described in detail as follows).

The said SRAM 23 may also be replaced with one register file (element not shown). The disadvantage of a register file lies in its larger number of the logic gates, which occupy more IC areas, and are not applicable to larger capacity, but its access is more flexible and able to be selected in view of the system requirement.

Figure 2:
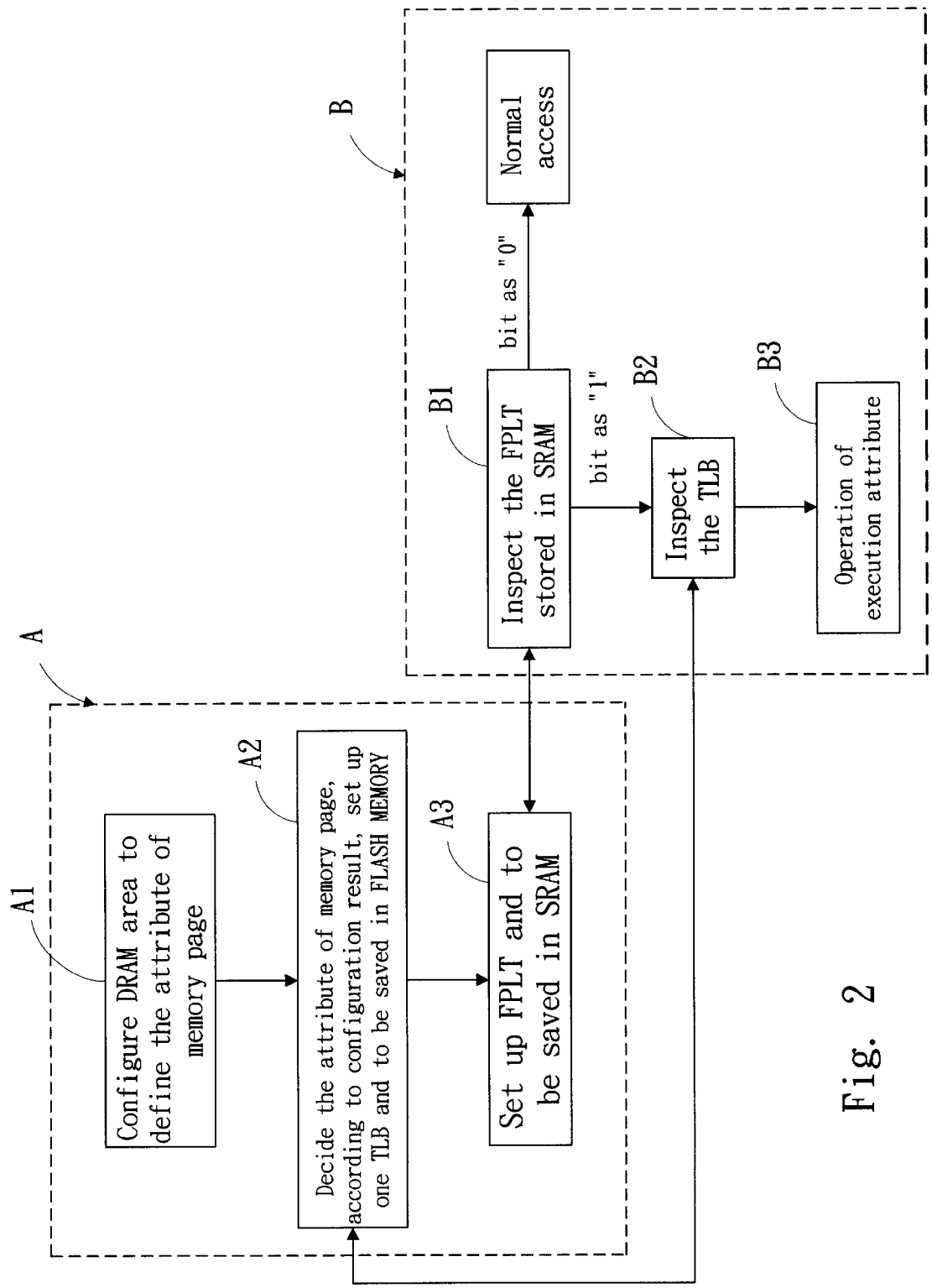
FIG. 2 is the method flow diagram in accordance with the present invention.
Figure 3:
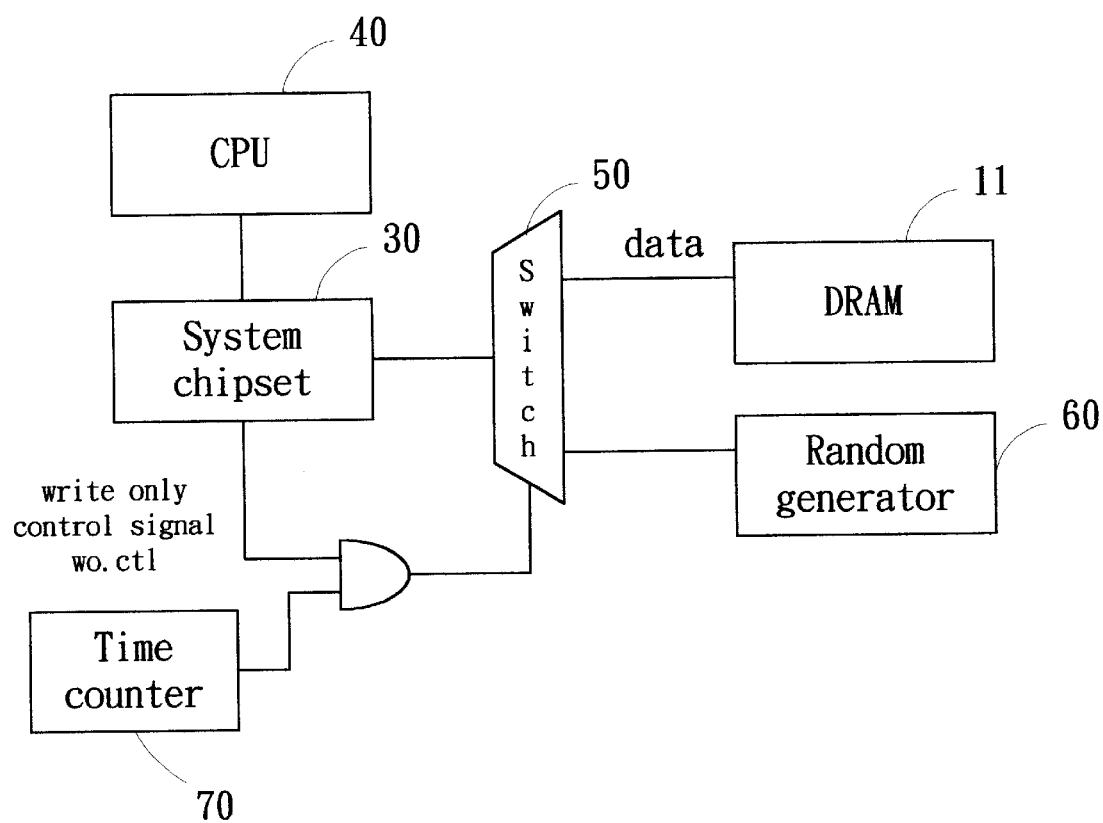
FIG. 3 is the hardware diagram of the attribute configuration in accordance with the present invention.

The present invention performs read/write control for the partial area of DRAM 11 through low-level driver or system chipset 30 (as shown in FIG. 3) which is use to control the DRAM 11, as shown in FIG. 2 and includes such two parts as register setting procedure A and real operation procedure B.

The said register setting procedure A is to, before processing memorized page 12 of DRAM 11, set the memorized page 12 area of DRAM 11, which is desired to be under control; after starting computer system, BIOS shall be executed first, and register setting procedure A engages in configuring during this period, while since control authority is not yet handed to the operation system and CPU 40, therefore, this register setting procedure cannot be changed after completion of configuration. The said register setting procedure includes the following steps:

Step A1, configure the area of DRAM 11 to define the attribute of memorized page 12, including start location of the said area, end location of the said area, page number and page size, etc., to define the partial area of DRAM 11 under the direct control of the low-level driver.

Step A2, determine the attribute of memorized page 12, and formulate a Table of Look-Aside Buffer (TLB) according to the above mentioned configuration result to point out an attribute table of a single memorized page 12 (as 003, 008 shown in Table 1) or a section of a memorized page (such as A02~A08 shown in Table 1), to be saved in the Flash memory 22 of DRAM 11.

Step A3, according to the above mentioned configuration result, formulate a Fast Page Lookup Table (FPLT) and store it in SRAM 23 of DRAM 11. The said FPLT is used for instructing the said memorized page 12 to operate in the normal access mode or in the page attribute operation mode.

Taking a 16 M DRAM module for example, it can be divided into 4000 segments, each of which is a memorized page of 4K(000~FFF). SRAM 23 also has 4000 bits redirecting to the memorized page 12 of each DRAM 11 respectively so as to instruct whether the said memorized page 12 is carried out in the normal access mode or in the page attribute operation mode. As the SRAM 23 bit which redirects to a certain memorized page 12 is "0", it indicates the said memorized page is in the normal access mode; as the SRAM23 bit is "1", it indicates the said memorized page is in the Page Operation mode. Then the system will inspect the Table of Look-Aside Buffer (TLB) to confirm the attribute of the said page (shown as Table 2).

For example, as the Fast Page Lookup Table (FPLT) of page 008 is "1", it will inspect the Table of Look-Aside Buffer (TLB) to confirm the operation attribute of page 008. From Table 1, it is known the attribute of the said memorized page 12 is configured to be read only, therefore, the memorized page 008 will only provide read, but not write operation.

TABLE 2

| Page | 000 | 001 | 002 | 003 | ... | 008 | ... | A02 | A03 | ... | FFC | FFD | FFE | FFF |
|---|---|---|---|---|---|---|---|---|---|---|---|---|---|---|
| FPLT | 1 | 0 | 0 | 1 | | 1 | | 1 | 1 | | | | | |

The said low-level driver mainly attempts to control the DRAM to perform such functions as read only, write only, write once, etc. The configuration and function of each attribute shall be described separately as follows:

[A] Read Only

As this area is configured to be read only, it performs Data Bus Mask (DQM) or masks Write Enable; in other words, it changes the sign of write cycle to read cycle, and is unable for writing any data to this area. Although any write instruction of CPU 40 shall be still in the normal operation, write operation is invalid because DQM or Write Enable is masked. Therefore, it shall not interfere the normal operation of CPU 40. Or in write cycle, the system chip simply returns CPU 40 a ready signal, indicating the write action is complete, making the CPU 40 write cycle actually performs a no operation status, and the write instruction will not be executed.

The read only function can be applied to system security. The password position where the CPU 40 read from DRAM 11 is configured to Read Only. Thus hackers will be unable to enter into the computer system through revising or changing.

TABLE 1

| | | | Page Attribute | | | | | |
|---|---|---|---|---|---|---|---|---|
| Page No. | Error Redirect | Read Only | Read Once | Read Twice | Write Only | Write Once | Write Twice | Read Redirect | Write Redirect |
| 003 | FFD | No | No | No | No | No | No | No | No |
| 008 | No | Yes | Yes | No | No | Yes | No | No | No |
| A02 | FFE | No. | No | No | Yes | Yes | Yes | No | No |

The said practical operation procedure B includes the following steps:

Step B1: inspect the Fast Page Lookup Table (FPLT) stored in SRAM 23, to confirm that memorized page 12 is engaged in the normal operation mode, or in the page operation mode through configuring page attribute.

Step B2: inspect the Table of Look-Aside Buffer (TLB) stored in flash memory 22, to confirm the operation attribute of the said memorized page 12.

Step B3, carry out the operation of executed attribute.

Take virus for another example. As the program is stored into the configured area in DRAM 11 waiting for being executed, since this area has been configured to read only, then during program execution, virus code cannot be written in and it can prevent the execution file from being contaminated. In other words, the invention blocks off the intrusion of the virus at the entrance of the execution program, no matter whether the computer system has virus code or not, it will never be executed.

[B] Write Only

Referring to FIG. 3, the data terminal of DRAM 11 is connected to an input terminal of a switch 50 and a random generator 60 is connected to another input terminal of the switch 50. The said switch 50 is under the control of a signal of write only control—wo.ctl. As wo.ctl is "0", the switch 50 will connect to CPU 40, and forward data to DRAM 11. As wo.ctl is "1", the switch 50 will forward the random data generated by the random generator 60 to CPU 40.

As the attribute of this area is configured to be write only, the signal wo.ctl of write only control will be configured to be "1". At this time, the write action will have no difference with DRAM 11 in general. If data are desired to be read from this area, the switch 50 will forward random data to CPU 40 to get the invalid data; that is, any read instruction of CPU 40 is still under normal operation, but because the read data are random, it forms an invalid read operation without interference of normal operation of CPU 40.

[C] Read Once

Referring to FIG. 3, as this area is configured to be read once, the said switch 50 is under the control of a time counter 70.

While carrying out the read action for the first time, it is general normal read action; while assigning a read instruction again, the time counter 70 (with configuration attribute value as "1") shall forbid the emergence of this action and by switching the switch 50 to random generator 60, what is read now is an invalid random number.

[D] Write Once

While configuring this area to be write once, the low-level driver will first inspect the starting address of the area and the terminating address of the area. If the area within is written into data, the said low-level driver will not permit data to be written in again.

Referring further to FIG. 3, the said time counter 70 will make record when write action happens; once finding that it has been written once, the low-level driver will not permit data to be written into again.

Besides, times can be configured through low-level driver. Thus the times of being written into the said area can be configured flexible and form an attribute of write N times (N as the configuration value) or read N times.

Figure 4:
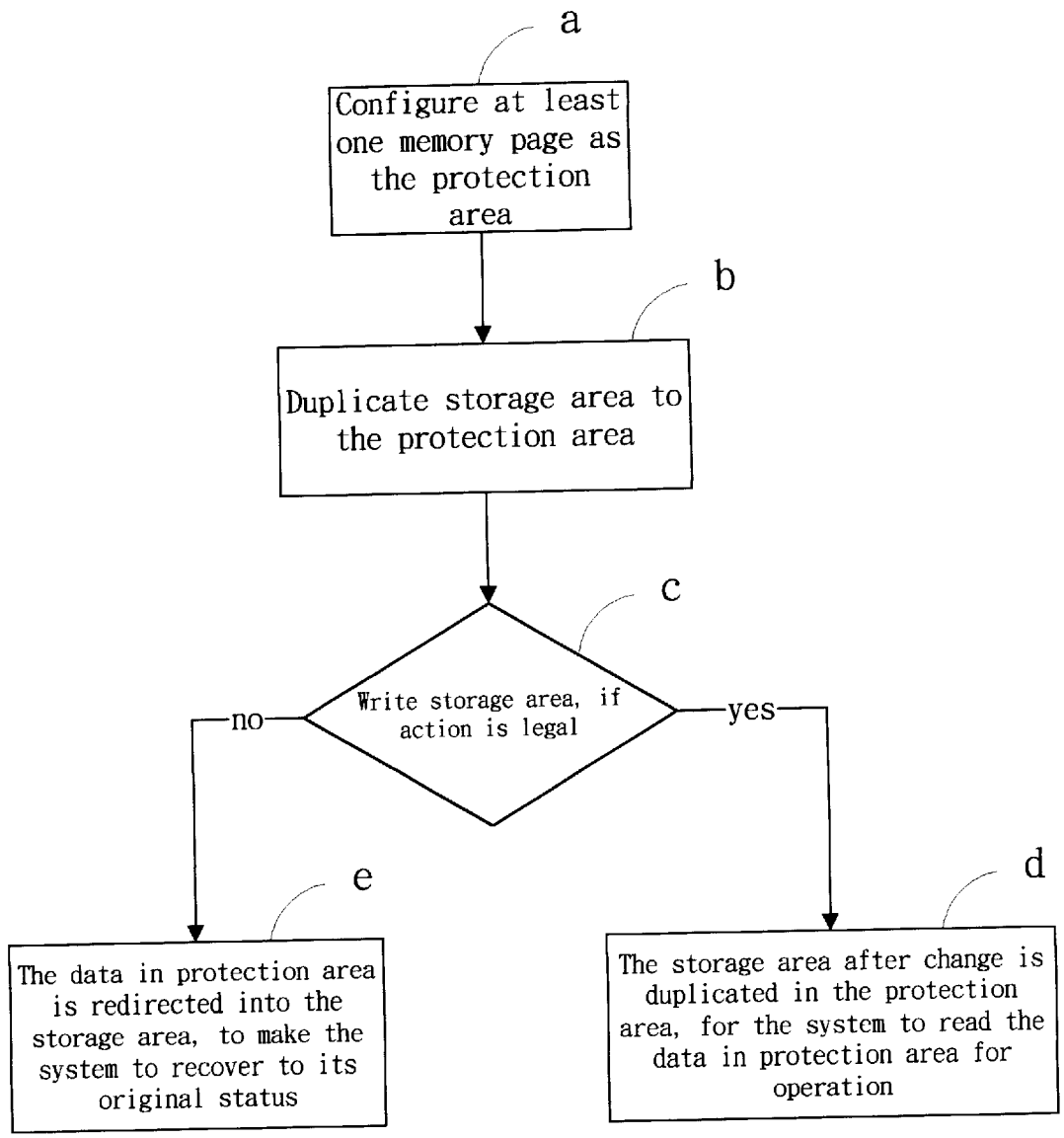
FIG. 4 is the Read Redirect attribute procedure flow diagram in accordance with the present invention.

[E] Read Redirect (Referring to FIG. 4)

While configuring this area to be read redirect, at least one memorized page 12 shall be configured first to serve as protection area (step a), and duplicate the memorized page which saves such important data as access authority, public key, private key, etc. (hereinafter referred to as the storage area) into the protection area (step b). If write action is discovered in the storage area, the system will not immediately accept the instruction and take action, but will first inspect whether the change of the content is legal (step c). If legally, the changed storage area will be duplicated into the protection area and the system can read the data from the protection area for operation (step d). If it is discovered to be illegal write, the wrong information or a write action which should not be made, the system will redirect the data in the protection area to the storage area, making the system recover to its original status (step e) and making the write action to form an invalid one so that the important data cannot be changed.

Figure 5:
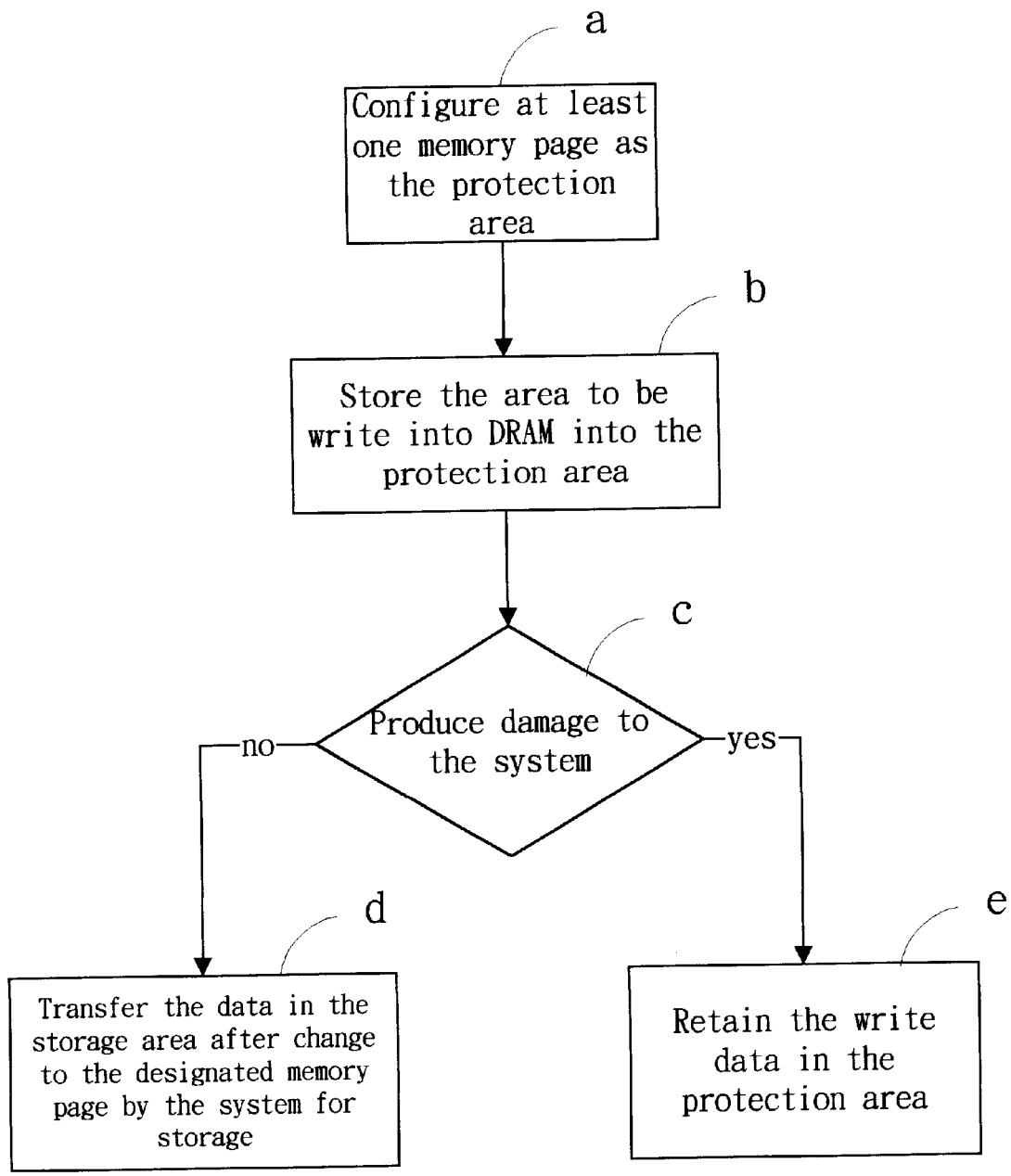
FIG. 5 is the Write Redirect attribute procedure flow diagram in accordance with the present invention.

[F] Write Redirect (Referring to FIG. 5)

While configuring this area to be write redirect, at least one memorized page shall be configured first to serve as protection area (step a), and each information which is desired to be written into DRAM will first be saved into the protection area (step b), to judge whether data may produce damage to the system (step c). If not, the information will be transferred to the designated memorized page by the system for storage (step d). If with damage, the write data will be retained continuously in the protection area without action (step e). It makes DRAM to be unable to perform a function in accordance with the revision content immediately, which provides a data re-inspecting path.

Taking for example, assuming the memorized page 2 serves for the storage area for access authority (or public key, private key, etc.), the content of the access right which has been revised shall be restored into the area 2, thus the system can open proper resource to the user in accordance with the newly configured authority. In general, the revision of access authority may include such three approaches as system authorization, virus, worm planted by a hacker. A virus code or a hacker normally intrudes through the revision of the system stack, while the revised stack position may be such commands as interrupt, the inspection of the user's access authority, etc. Once it is revised and duplicated into the second memorized page, the system will immediately respond and receive the new access authority, thus a hacker may become the super user to get access to any resource of the system, or to change the interrupt signal of the existing intent for accessing the hard disk data to delete the data of hard disk, or format hard disk, etc. so as to damage the completeness of hard disk data and make the system unable to operate normally.

Therefore, in the attribute of read redirect in the present invention, we may put the data of the recognized user's access authority into the protection area (hereby it is explained in memorized page 10). After the user's access authority is revised, it will be saved in the protection area of memorized page 10 first to judge whether it is a legal revision (such as, the judgment that stack push-down and stack pop-up command are in balance or overflow); if it is legal, the data in the protection area of memorized page 10 will be transferred to page 2, making the computer accept the content which has been revised and operate in accordance with it, otherwise it will continuously be stored in the protection area and separate from the system to terminate the chance of any illegal revision or virus intrusion.

In addition, among the above various attribute configuration, once the switch is turned to random generator 60 to forward the invalid random number to CPU, making CPU unable to perform various contrary functions of the configured attributes vs. DRAM (for example: in read only attribute, CPU cannot perform write function, etc.). In other words, during this period of time, CPU and DRAM are in segregative status, but can still perform normal access operation to other control units in the system.

Concluding the above, the operation method of memorized page access attributes provided by the present invention concerning memory control and its structure, can further perform attribute configuration and then confirm the memorized page attribute. It can increase DRAM operation function, not receive the storage data from CPU or hard disk across-the-board any more, and further control and manage the data flow to provide a common protection for the system safety. It offers a valid solution and measures in allusion to the disadvantage of a traditional safety system that is unable to provide comprehensive protection to DRAM and actually conforms to the conditions of invention patent application.

I claim:

1. An operation method for controlling access attributes of a memory page of a memory, comprising two parts:

buffer memory set program:

procedures of setting DRAM area in order to define an attribute of the memory page comprising to set a starting address and a terminating address of the DRAM area, a number of the memory page and a number of occupied bits of the memory page, for defining partial area of the DRAM area under the direct control of a low-level driver;

procedures of defining the memory page attribute being to set up a Table of Look-Aside Buffer (TLB) based on the set starting address and the set terminating address of the DRAM area, the set number of the memory page and the set number of occupied units of the memory page for pointing out an attribute table of a single memory page or an area of a memory page;

procedures of setting up a fast page lookup table being according to results of the buffer memory set program, for indicating whether said memory page being under a normal access mode or a page attribute operating mode;

practical operation program:

the practical operation procedure being to check the fast page lookup table and the Table of Look-Aside Buffer, and in accordance with memory page attribute records of the two tables to set the DRAM to be operations as read only, write only, configured times of read and write, read redirect, write redirect; wherein said read only function performs a Data Bus Mask (DQM) or masks the write enable signal, thereby changing the write cycle into a read cycle or alternatively a system chip shall respond to a write signal generated by a CPU with a signal indicating the write action is complete, making said CPU perform a no operation status, thereby preventing the write instruction from executing: wherein to set the read redirect the following steps are utilized:

a. setting up at least one memory page to serve as a protection areas;

b. duplicating other memory pages using important data such as a user's access authority, public key, or private key into the protection area;

c. judging whether an action of writing and storing important data into the memory page is legal; if yes, the data is duplicated into the protection area and the system reads the data from the protection area; if judged to not be legal and the write action should not have been made, the system will redirect the data in the protection area to the duplicated memory page, making the system recover its original status, reversing any illegal changes made to the duplicated memory page.

2. The operation method for controlling access attributes of the memory page of the memory as recited in claim 1, wherein to set write redirect includes the following steps;

a. setting up at least one memory page to serve as a protection area;

b. storing data to the protection area;

c. judging whether the written data is damaging to a system; if not, the data being transferred to the memory page designated by the system; if yes, then the write data being retained continuously in the protection area, the DRAM being unable to immediately function in accordance with the content and providing a path of re-inspecting data.

3. The operation method for controlling the access attributes of the memory page of the memory as recited in claim 1, wherein the write only is controlled by a write only signal controller and switched to a random number generator, then produced random number data is transmitted to a CPU causing invalid read information.

4. A structure for controlling access attributes of memory pages of a memory, comprising a DRAM and the plurality of memory pages;

a memory control unit having:

a control unit controlling access of each memory page and a inner memory is devised to save results of a set starting address and a set terminating address of a DRAM area, a set number of the memory pages and a set number of occupied units of the memory page;

a SRAM saving a fast page lookup table, a plurality of instruction bits being mapped to the memory pages and instructing whether the memory page being under a normal access mode or a page attribute operating mode;

a switch, which one input terminal connecting a data terminal of the DRAM; and a random number generator connecting another input terminal and being controlled by a counter or a write only signal controller.

5. The structure for controlling the access attributes of the memory pages of the memory as recited in claim 4, wherein the fast page lookup table is stored in a register.

6. The structure for controlling the access attributes of the memory pages of the memory as recited in claim 4, wherein write only is controlled by the write only signal controller and switched to the random number generator, then produced random number data is transmitted to a CPU causing invalid read information.

7. The structure for controlling the access attributes of the memory pages of the memory as recited in claim 4, wherein the counter is set by a low-level driver to set up times of the write or times of the read, that is to set access of a certain number of the times of the write or a certain number of the times of the read.

8. An operation method for controlling access attributes of a memory page of a memory, comprising two parts:

buffer memory set program:

procedures of setting DRAM area in order to define an attribute of the memory page comprising to set a starting address and a terminating address of the DRAM area, a number of the memory page and a number of occupied bits of the memory page, for defining partial area of the DRAM area under the direct control of a low-level driver;

procedures of defining the memory page attribute being to set up a Table of Look-Aside Buffer (TLB) based on the set starting address and the set terminating address of the DRAM area, the set number of the memory page and the set number of occupied units of the memory page for pointing out an attribute table of a single memory page or an area of a memory page;

procedures of setting up a fast page lookup table being according to results of the buffer memory set program, for indicating whether said memory page being under a normal access mode or a page attribute operating mode;

practical operation program:

the practical operation procedure being to check the fast page lookup table and the Table of Look-Aside Buffer, and in accordance with memory page attribute records of the two tables to set the DRAM to be operations as read only, write only, configured times of read and write, read redirect; write redirect, wherein said read only function performs a Data Bus Mask (DQM) or masks the write enable signal, thereby changing the write cycle into a read cycle, or alternatively a system chip shall respond to a write signal generated by a CPU with a signal indicating the write action is complete, making said CPU perform a no operation status, thereby preventing the write instruction from executing; wherein to set write redirect includes the following steps:
  a. setting up at least one memory page to serve as a protection area;
  b. storing data to the protection area;
  c. judging whether the written data is damaging to a system; if not, the data being transferred to the memory page designated by the system; if yes, then the write data being retained continuously in the protection area, the DRAM being unable to immediately function in accordance with the content and providing a path of re-inspecting data.

9. The operation method for controlling the access attributes of the memory page of the memory as recited in claim 1, wherein the write only is controlled by a write only signal controller and switched to a random number generator, then produced random number data is transmitted to a CPU causing invalid read information.

* * * * *